United States Patent [19]

Dowell

[11] 4,000,346

[45] Dec. 28, 1976

[54] OPTICALLY TRANSPARENT, ELECTRICALLY CONDUCTIVE COATING

[75] Inventor: Michael Brendan Dowell, Hudson, Ohio

[73] Assignee: Union Carbide Corporation, New York, N.Y.

[22] Filed: July 7, 1975

[21] Appl. No.: 593,487

Related U.S. Application Data

[63] Continuation-in-part of Ser. No. 424,272, Dec. 13, 1973, abandoned.

[52] U.S. Cl. .................... 428/336; 428/432; 428/446; 428/539; 427/108; 427/109; 427/110; 427/126; 427/164; 427/165; 427/168; 427/169; 427/380
[51] Int. Cl.$^2$ .................... B32B 15/00; B05D 5/06
[58] Field of Search .................... 427/108–110, 427/372, 164, 165, 168, 169, 126, 380; 428/432, 539, 446, 336

[56] References Cited

UNITED STATES PATENTS

| | | | |
|---|---|---|---|
| 2,691,323 | 10/1954 | Raymond | 427/168 |
| 2,733,325 | 1/1956 | Cox | 427/108 |
| 2,825,687 | 3/1958 | Preston | 427/108 |
| 3,019,135 | 1/1962 | Orr | 427/108 |
| 3,516,720 | 6/1970 | Mauer | 427/108 |
| 3,539,392 | 11/1970 | Cockbain | 427/108 |
| 3,544,361 | 12/1970 | Servair | 427/108 |
| 3,617,341 | 11/1971 | Fefferman | 428/432 |

Primary Examiner—Michael F. Esposito
Attorney, Agent, or Firm—Israel Blum

[57] ABSTRACT

An electrically conductive and optically transparent coating comprising a very thin, noble metal oxide film applied to a nonconductive, transparent substrate, said noble metal selected from the group consisting of ruthenium, rhodium, osmium and iridium. These coatings are useful as resistance heaters for windows, as optically transparent electrodes for electro-optic and electro-chemical applications, for radio frequency shieldings and a wide variety of other applications.

20 Claims, No Drawings

OPTICALLY TRANSPARENT, ELECTRICALLY CONDUCTIVE COATING

RELATED APPLICATIONS

This application is a continuation-in-part application of U.S. patent Application Ser. No. 424,272, filed Dec. 13, 1973 now abandoned.

FIELD OF THE INVENTION

This invention relates to electrically conductive and optically transparent coatings. In one aspect, the invention relates to coatings having physical properties not heretofore found in coating compositions. In a further aspect, this invention relates to noble metal oxide films which are ideally suited for coating nonconducting, optically transparent substrates, said noble metal selected from the group consisting of ruthenium, rhodium, osmium and iridium.

DESCRIPTION OF THE PRIOR ART

Ruthenium oxide has been employed as a conductive coating for titanium, tantalum and other film forming metals to form anodes or electrodes used in electrolytic cells for the production of chlorine by electrolysis of brine. However, it is well known that with respect to a material, in general, possession of a significant amount of electrical conductivity is mutually exclusive with possession of a significant amount of optical transmission coefficient. The charge carriers which provide conductivity also scatter incident light simultaneously. Consequently, having good electrical conductivity generally precludes the material's also having a large optical transmission coefficient. A combination of a good optical transmission coefficient with a good electrical conductivity is essentially a compromise since the two parameters are generally not harmoniously correlated.

Heretofore, various doped tin oxide films were used in an attempt to surmount the problem of providing an electrically conductive and optically transparent coating to substrates which are nonconducting and optically transparent. By optically transparent is meant having the property of transmitting light such that at least 10% of visible light from sunlight or otherwise is transmitted and more preferably at least 90% luminous transmittance. By doped tin oxide films is meant a film consisting of tin oxide "doped" by the addition of certain electron donating species that render the material into a broad-band n-type semi-conductor. These dopes or unstiochiometric tin oxides are formed by the addition of antimony, indium, fluoride and the like. Doped tin oxide films are electrically conductive and optically transparent at wavelengths between about 1900 angstoms to about 12,600 angstroms. However, doped tin oxide films are generally formed in a controlled atmosphere or in vacuum and equipment is required to control atmosphere conditions and impurity levels. Moreover, due to instability, doped tin oxide films can not be used advantageously above about 250° C. Thin gold films have also been used, but are not particularly transparent.

SUMMARY OF THE INVENTION

It is, therefore, an object of this invention to provide very thin coatings comprising certain noble metal oxide films which are electrically conductive and optically transparent throughout a wide band of wavelengths, making them suitable for application to glass, electrodes, laser frequency doublers, piezoelectric-acoustic-optic devices and the like. Another object of this invention is to provide a process for coating nonconducting, optically transparent substrates with a very thin film comprising certain noble metal oxides and a process for the preparation of the films. These and other objects will readily become apparent to those skilled in the art in the light of the teachings herein set forth.

This invention is based on the discovery that electrically conductive, very thin films comprising noble metal oxides such as ruthenium, iridium, rhodium and osmium oxides have a surprising degree of optical transparency. Thus, the invention comprises applying an electrically conductive and optically transparent coating to a nonconducting, optically transparent substrate such as glass, the coating comprising a continuous and adherent, very thin film of a noble metal oxide, the noble metal selected from the group consisting of ruthenium, rhodium, osmium and iridium. These noble metal oxide films may be in the form of their individual oxides, either singularly or in mixtures.

The term "noble metal" as used throughout the specification and claims, unless otherwise indicated, should be understood to mean the so called "precious metals" of the second and third transition series of the Periodic Table of Elements, including ruthenium, rhodium, osmium and iridium. Moreover, the term "noble metal oxide films" as used throughout the specification and claims should be understood, unless otherwise indicated, to mean a film comprising a single noble metal oxide or a film of a physical mixture comprising a noble metal oxide with one or more other noble metal oxides, or a film of a physical mixture comprising one or more noble metal oxides with one or more oxides of a metal other than a noble metal as hereinabove defined, or a film of a solid solution comprising one or more noble metal oxides with one or more oxides of a metal other than a noble metal as hereinabove defined. In the physical mixture of oxides, the individual oxides are present as discrete particles.

It has also been discovered that the application of a noble metal oxide film does not require a controlled atmosphere, and is relatively insensitive to impurities. These qualities render its application to the substrate surfaces more convenient than the application of doped tin oxide films. Furthermore, since noble metal oxide films such as ruthenium oxide films are formed and are stable at temperatures ranging from about 350° C. to about 700° C., these films can be used at higher temperatures than can comparable doped tin oxide films which cannot be used above about 500° C.

It is further been discovered that noble metal oxide films are optically transparent at wavelengths between about 1900 A and about 40,000 A. Optically transparent electrodes useful in laser communication systems must be transparent at the wavelengths of the laser. A very common and important laser wavelength is 1.06 $\mu$ or 10,600 A. Since noble metal oxide films are optically transparent over a wider range of wavelengths than comparable doped tin oxide films whose range extends from about 1900 A to about 12,600 A, they are better suited for such applications as laser transmissions than doped tin oxide films. For example, although a doped tin oxide film's absorption edge significantly attenuates 10,600 A, a common laser radiation, a noble metal oxide film does not. Thus electro-optic cells coated with a thin film of ruthenium oxide, for example, are preferable to doped tin oxide coated cells for modulating common laser signals on wavelengths such as 10,600 A (or frequency doubled 5300 A) as well as longer wavelengths.

The noble metal oxide films of this invention display electrical conductivities which range from about 1 ohm$^{-1}$ cm$^{-1}$ to about 1000 ohm$^{-1}$ cm$^{-1}$ depending on conditions of deposition, and preferably have an electrical resistance which is no greater than about 700 ohms per square, and more preferably no greater than about 500 ohms per square. This unusually desirable blend of optical and electrical characteristics is attained because the film can be made very thin, and because the carrier concentration of the film can be controlled over a wide range by controlling conditions of deposition.

In the process of this invention, a very thin layer of a solution consisting of a noble metal salt dissolved in a solvent, the salt preferably a ruthenium and/or iridium salt which decomposes at an elevated temperature, is deposited on an optically transparent substrate. This solution is evaporated at low temperature to minimize the amount of retained solvent, and the substantially solventless salt residue so left is then heated for about two minutes to about twenty minutes at about 350° C. to about 700° C., depending upon the properties of the substrate and the thickness of the film, in order to form a conductive layer that covers and adheres to the surface of the substrate which layer comprises a thin film of ruthenium oxide and/or iridium oxide.

Those skilled in the art will readily recognize that soluble compounds of ruthenium and iridium which decompose at elevated temperatures include among others, chlorides, bromides, nitrates, acetates and a number of organometallic compounds. Included among the organo-metallic compounds which are useful in this invention are ruthenium and iridium resinates such as those sold under trade name "Hanovia" (commercially available from Engelhard Industries, Newark, N.J.).

The decomposition of the ruthenium and iridium compounds may be carried out in solution using an inert, normally liquid solvent such as the aqueous inorganic acid solutions, halogenated hydrocarbons, alcohols, heterocyclic compositions and the like. Illustrative solvents include, among others, benzene, carbon tetrachloride, methylene chloride, n-butanol, acetic acid, linalool, aqueous hydrochloric acid, chlorobenzene, cyclophexene and the like. Preferably, solvents that are especially suited for particular compounds should be used. For example, nitrates of ruthenium and iridium should be dissolved in aqueous inorganic acid solutions, halides and acetates of ruthenium and iridium should be dissolved in alcohols, and resinates of ruthenium and iridium in linalool.

In general, solutions as hereinabove described may be applied to optically transparent, nonconducting substrates by any one of several methods which are known to those skilled in the art, including brushing, rolling, screening, printing and the like. In most instances, the shape of the particular item will influence to a degree the optimum method to be employed. Whatever method is employed, it should ensure that a complete and continuous thin coating is obtained.

Drying of the substrates coated in accordance with the teachings of this invention can be conveniently effected by a variety of means. For example, the coated substrate can be dried by the use of electromagnetic waves, e.g., induction or high frequency dryers. Other examples include the use of infrared dryers, air dried in a stream of hot air, or other suitable methods. Suitable drying temperatures range from about 60° C. to about 160° C., depending on the evaporation temperature of the solvent(s) which were chosen for the particular compounds used.

The firing temperatures at which the process of this invention may be carried out range from about 300° C. to about 800° C. The minimum firing temperature must be sufficient to decompose the ruthenium or iridium compound, generally above about 300° C. The maximum firing temperature must exceed neither the decomposition temperature of ruthenium oxide, generally about 800° C. in air, nor the decomposition temperature of the substrate. Examples of optically transparent substrates which are dimensionally stable at about 800° C. in air include quartz, alumina (e.g., ruby, emery, sapphire, etc.) fused silica, magnesia and the like. Of curse, the maximum firing temperature will be lower than about 800° C. in air when the substrate used is not stable at about 800° C., at no time exceeding the decomposition temperature of the substrate. For example, substrates such as Pyrex glass and window glass are not stable at about 800° C. and would require firing temperatures ranging from 600° C. to about 400° C., respectively.

Although normally the soluble compounds of ruthenium and iridium are thermally decomposed in the presence of air or oxygen, an inert atmosphere may be used to form the conductive noble metal oxides. In such a case it may be advantageous to decompose the noble metal salt of an oxidant, for example, the nitrate. Or a catalyst such as benzoyl peroxide or tetra-isopropyl orthotitanate may be added to the solution containing thermally decomposable metal compound. Of great concern is the undesirable color properties which many catalysts can impart. It is imperative that the optical properties of the noble metal oxide coating be compatible with the properties of the substrate. Consequently, if a catalyst is employed in the instant invention, it must effectively promote the oxidation of the noble metal to the oxide without imparting any undesirable color to the coating.

Thickness of the coating can range from about 0.2 $\mu$m to about 2.0 $\mu$m. Preferably, a coating thickness of about 0.5 $\mu$m is used. However, the preferred thickness for the overall coating will depend primarily on the end-use application of the coated article. Depending on the thickness of the coating, light transmission ranges from about 10% to about 90%.

An electrically conductive and optically transparent coating typical of this invention provides a means for defogging or frosting glass in motor vehicles or aircraft by simple electrical resistance heating. In addition, since the coating is transparent over a wide band of frequencies including infrared transmission, it has a variety of uses in laser beam communication systems. For example, coatings applied to electro-optic devices can facilitate frequency, amplitude, phase, etc. modulation of light beams in laser transmissions, i.e., since transmitted light can be modulated by means of variations in an electric field applied to a coated electro-optic device, it can carry information and operates as a communication device. In general, the coatings formed in the process of this invention may be used in electronics, non-linear optics, and various other purposes. These advantages are also obtained by the use of mixtures of noble metal oxides and oxides of other metals.

DESCRIPTION OF THE PREFERRED EMBODIMENTS

Although it is not required, a substrate typically employed in the process of this invention may be pretreated before it is entirely or partially coated with a noble metal oxide film. Such a pretreatment will generally involve a means of degreasing and removing foreign materials on the substrate, rendering the substrate more receptive to the introduction of the coating of this invention.

This invention is not limited to ruthenium and/or iridium oxides; thermally decomposable compounds of other noble metals are equally suitable in the formation of electrically conductive oxides as a result of heating. Such noble metal compounds are taken from the group of metal compounds whose base metal consists of rhodium and osmium. These noble metal compounds would be formed into, according to the process of this invention, very thin electrically conductive oxide films.

In one embodiment of this invention, other compatible ingredients may be added to the solution containing thermally decomposable metal compounds. Salts or organometallic compounds of one or more of the value metals may be added to the solution. By valve metals is meant titanium, zirconium, hafnium, vanadium, niobium, tantalum, chromium, molybdenum and wolfram. By then following the process of this invention as described hereinabove, an optically transparent thin film comprising a solid solution of a noble metal oxide such as ruthenium oxide and/or iridium oxide and a valve metal oxide is provided. The valve metal oxides are advantageously employed since they are resistant to reduction or refraction. By the process of this invention, such oxides are admixed in quantities up to 38% by weight of the noble metal oxide, preferably up to 10% by weight, to control reduction of the noble metal oxide film. The films formed as described hereinabove generally have somewhat increased resistance to thermal decomposition, abrasion and aggressive chemical environments. As an illustration, when an equimolar mixture of "Hanovia" ruthenium and titanium resinates (commercially obtained from Englehard Industries, Newark, N.J.) was heated at about 500° C., it decomposed into a thin film having a resistance of approximately 700 ohm/sq and an optical transmission coefficient of approximately 20 percent. It is readily seen that thin films formed from similar mixtures of platinum group and valve metal compounds as hereinabove described may exhibit conductivity-transmitivity properties comparable to or superior to those of noble metal oxide films such as ruthenium oxide films.

The following example is illustrative of the concept of this invention, demonstrating the quality of the electrically conductive, optically transparent films which can be formed according to this invention. It is not intended to restrict the invention in any way. Using a camel's hair brush, a solution made by dissolving 3.33 g $RuCl_3 \cdot xH_2O$ (aqueous ruthenium trichloride commercially available from Matheson, Coleman & Bell, assay 38% ruthenium by weight) in 10 ml hydrochloric acid (6 mols aqueous) was brushed onto Pyrex plates. After being dried 5 minutes in air at 110° C., the plates were fired 5 minutes in air at 600° C. The resulting neutral gray film had an optical transmission of 40 percent for green light at 5850 A using a Jarrell-Ash photodensitometer. Microscopic examination in transmitted light at 750X magnification showed that the film was continuous. Resistance measurements using mercury bead contacts showed a resistance of 70 ohms/sq. A metal content of 0.297 mg. $Ru/cm^2$ was determined by X-ray fluorescence analysis, which metal content is equivalent to a ruthenium oxide film thickness of 0.6 $\mu$m.

What is claimed is:
1. A process for applying a coating to a surface of a substrate comprising the following steps:
   a. depositing a solution onto an electrically nonconducting and optically transparent substrate, said solution comprising a noble metal salt, said noble metal selected from the group consisting of ruthenium, rhodium, osmium and iridium; and
   b. evaporating said solution at a temperature sufficient to leave a residue of said salt; and
   c. heating said residue at a predetermined temperature for a time period sufficient to convert said deposit into a coating of predetermined thickness between about 0.2 $\mu$m and about 2 $\mu$m on said substrate, said coating comprising a noble oxide film having an electrical resistance no greater than about 700 ohms per square and optical transparency.
2. A process as defined in claim 1 wherein said electrical resistance is no greater than about 500 ohms per square.
3. A process as defined in claim 1 wherein in step (a) said solution also includes a solvent.
4. A process as defined in claim 3 wherein said salt is a member selected from the group consisting of a halide, an acetate, a nitrate and resinate.
5. A process as defined in claim 4 wherein step (a) said solvent is a normally liquid solvent selected from the group consisting of an aqueous inorganic acid solution, a halogenated hydrocarbon, an alcohol and a heterocyclic composition.
6. A process as defined in claim 5 wherein in step (a) said salt is a nitrate and said solvent is an aqueous inorganic solution.
7. A process as defined in claim 5 wherein in step (a) said salt is a halide and said solvent is an alcohol.
8. A process as defined in claim 5 wherein in step (a) said salt is an acetate and said solvent is an alcohol.
9. A process as defined in claim 5 wherein in step (a) said salt is a resinate and said solvent is linalool.
10. A process as defined in claim 1 wherein in step (b), said temperature is between about 60° C. and about 160° C; and in step (c), said predetermined temperature is between about 350° C. and about 700° C. and said time period is between about two minutes and about 20 minutes.
11. A process as defined in claim 1 wherein said optical transparency is present at a wavelength between about 1900 A and about 40,000 A.
12. A process as defined in claim 11 wherein said wavelength is about 10,600 A.
13. A process as defined in claim 1 wherein said substrate is a member selected from the group consisting of quartz, alumina, fused silica, magnesia, glass and Pyrex glass.
14. A process as defined in claim 1 wherein in step (a) said solution further includes up to about 38 percent by weight of a member selected from the group consisting of a valve metal organometallic compound and a valve metal salt.
15. A process as defined in claim 1 wherein in step (a) said solution contains an equimolar mixture of a noble metal salt and a valve metal salt; said noble metal selected from the group consisting of ruthenium, rhodium, osmium and iridium.

16. A process as defined in claim 15 wherein said noble metal salt is a ruthenium resinate and said valve metal salt is a tin resinate.

17. A conductive, optically transparent composite comprising at least a first layer of an electrically conductive, optically transparent coating and a second layer of a nonconducting, optically transparent substrate, said first layer bonded to and covering at least one surface of said second layer; said first layer composed of a noble metal oxide film and characterized by an electrical resistance no greater than about 700 ohms per square and a thickness between about 0.2 $\mu$m and about 2 $\mu$m such that light transmission through said coating is not reduced to less than about 10 percent, said noble metal selected from the group consisting of ruthenium, rhodium, osmium and iridium.

18. A composite as defined in claim 17 wherein said substrate is a member selected from the group consisting of quartz, alumina, fused silica, magnesia, glass and Pyrex glass.

19. A composite as defined in claim 17 which is optically transparent at a wavelength between about 1900 A and about 40,000 A.

20. A composite as defined in claim 19 wherein said wavelength is about 10,600 A.